United States Patent
Arrighetti et al.

[15] 3,676,512
[45] July 11, 1972

[54] POLYENE HYDROCARBONS CONTAINING AT LEAST TWO CONJUGATED DOUBLE BONDS AND PROCESS FOR OBTAINING SAME

[72] Inventors: Sergio Arrighetti, Milan; Eugenio Vajna; Sebastiano Cesca, both of San Donato Milanese, all of Italy

[73] Assignee: Snam Progetti S.p.A., Milan, Italy

[22] Filed: Jan. 22, 1971

[21] Appl. No.: 109,034

[30] Foreign Application Priority Data

Jan. 22, 1970 Italy...................................19654 A/70
Jan. 22, 1970 Italy...................................19656 A/70

[52] U.S. Cl....................................260/666 PY, 260/666 A
[51] Int. Cl........................................................C07c 5/24
[58] Field of Search...............................260/666 A, 666 PY

[56] References Cited

UNITED STATES PATENTS

| | | | |
|---|---|---|---|
| 3,345,419 | 10/1967 | Tinsley et al | 260/666 PY |
| 3,347,944 | 10/1967 | Fritz | 260/666 PY |
| 3,151,173 | 9/1964 | Nyce | 260/666 PY |
| 3,565,961 | 2/1971 | Nagase et al | 260/666 PY |
| 3,214,483 | 10/1965 | Cripps | 260/666 PY |

*Primary Examiner*—Delbert E. Gantz
*Assistant Examiner*—Veronica O'Keefe
*Attorney*—Ralph M. Watson

[57] ABSTRACT

There are provided novel triene hydrocarbons, having at least two conjugated double bonds, and being of the general formula $$A-(C(R_o)_2)_n-(CH)_m=B$$

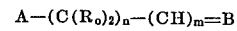

in which A is a radical consisting of a ring containing an endomethylene group; B may be both a linear alkadiene radical and a substituted and unsubstituted alkene or cycloalkene radical; $R_o$ may be hydrogen, an aryl or an alkyl radical, n is a number ranging from 0 to 3; and m is 0 or 1. If $n$ is not 0, m is 0; if $n$ is 0, $m$ is 0 or 1.

9 Claims, No Drawings

POLYENE HYDROCARBONS CONTAINING AT LEAST TWO CONJUGATED DOUBLE BONDS AND PROCESS FOR OBTAINING SAME

The present invention relates to new polyene hydrocarbons containing at least two conjugated double bonds and to the process for obtaining same. Particularly the present invention relates to new triene hydrocarbons having the following formula:

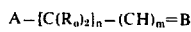

in which A is a radical consisting of a ring containing an endomethylene group; B may be both a linear alkadiene radical and a substituted and unsubstituted alkene or cycloalkene radical; $R_o$ may be hydrogen, an aryl or an alkyl radical, $n$ is a number ranging from 0 to 3; and $m$ a number selected between 0 and 1. In the above formula if $n$ is different from 0, $m$ is 0; in the case $n$ is 0, $m$ may be both 0 and 1.

In the case $n$ is different from 0, A is a radical having the formula

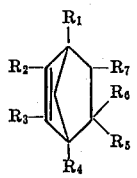

in which $R_1$, $R_2$, $R_3$, $R_4$, $R_5$, $R_6$ and $R_7$ usually are hydrogen, but may be alkyl, cycloalkyl or aryl radicals too; B is an alkadiene group containing two conjugated double bonds and selected between the following radicals:

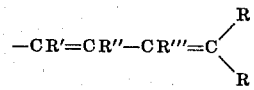

and

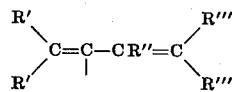

wherein R always is an alkyl radical; R', R'' and R''' may be hydrogen, alkyl or aryl radicals.

The aforesaid hydrocarbons are obtained by reacting a Grignard derivative with a carbonyl compound in which the carbonyl group is conjugated with a carbon-carbon double bond, for example according to the following reaction scheme

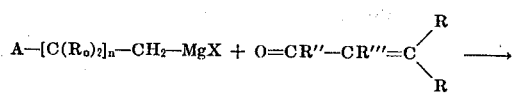

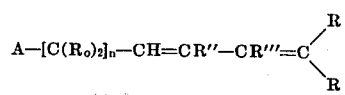

wherein A, R, $R_o$, R'' and R''' have the known meanings and X is a halogen as Cl, Br or I.

The above mentioned reaction runs out also in the case the reactants are inverted:

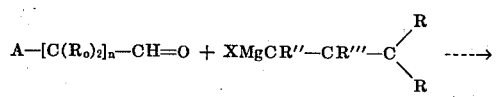

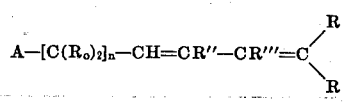

The hydrocarbons of the present invention may be synthetized also by means of the Diels-Alder reaction between cyclopentadiene and triolefins having at least two conjugated double bonds and alkyl substituents in the carbon atoms of the conjugated double bonds in order to avoid they react in the same condensation reaction:

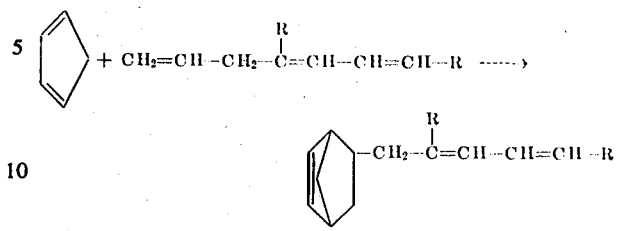

In the case $n$ is 0, A is a radical having the formula

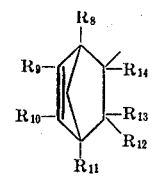

if $m$ is 1; if $m$ is 0, A is the following radical

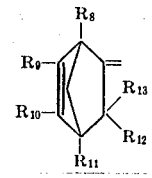

In both cases $R_8$, $R_9$, $R_{10}$, $R_{11}$, $R_{12}$, $R_{13}$ and $R_{14}$ usually are hydrogen, but may be also alkyl radicals having a number of carbon atoms ranging from one to five; B is a radical selected from the following ones:

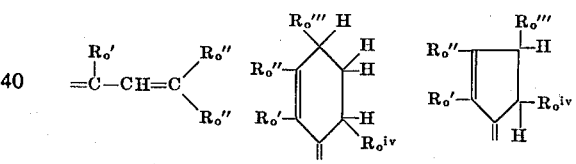

in which $R_o'$, $R_o''$, $R_o'''$ and $R_o^{iv}$ may be hydrogen or alkyl radicals having one to five carbon atoms.

These hydrocarbons are obtained by reacting a Grignard derivative of a substituted allyl or vinyl halide with a carbonyl compound containing a ring having an endomethylene group, for example according to the following reaction scheme:

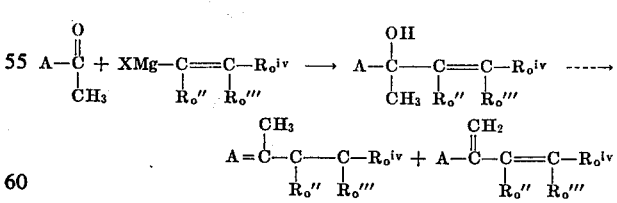

wherein A, $R_o''$, $R_o'''$ and $R_o^{iv}$ have the known meanings and X is a halogen as Cl, Br or I. It is possible to employ some other Grignard derivative as

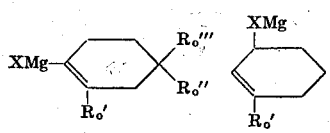

and to utilize also carbonyl compounds having the formula

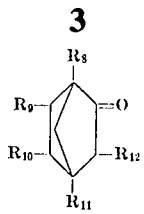

wherein the substituents have the well known meanings.

The hydrocarbons may also be synthetized by reacting a Grignard derivative of a substituted or unsubstituted norbornene halide with a cyclic ketone in which the carbonyl group is conjugated with a double bond, for example according to the following reaction scheme:

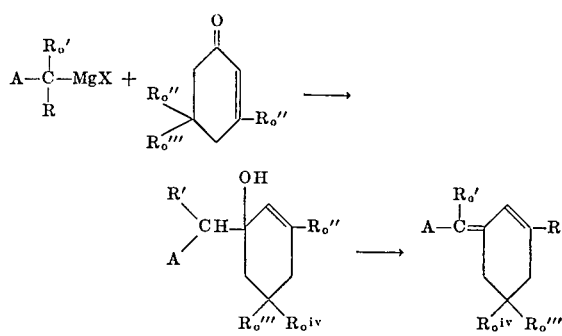

wherein A, $R_o'$, $R_o''$, $R_o'''$, $R_o^{iv}$ and X have the known meanings.

All the above mentioned reactions are carried out at a temperature comprised in the range −10° to 100° C. The reactions are generally carried out in the presence of a solvent which may be selected among tetrahydrofurane, dioxane, ethyl ether, butyl ether and the like, or aromatic hydrocarbons as benzene, toluene, xylenes or mixtures of the cited solvents.

Typical unrestrictive examples of triene compounds according to the present invention are the following ones:

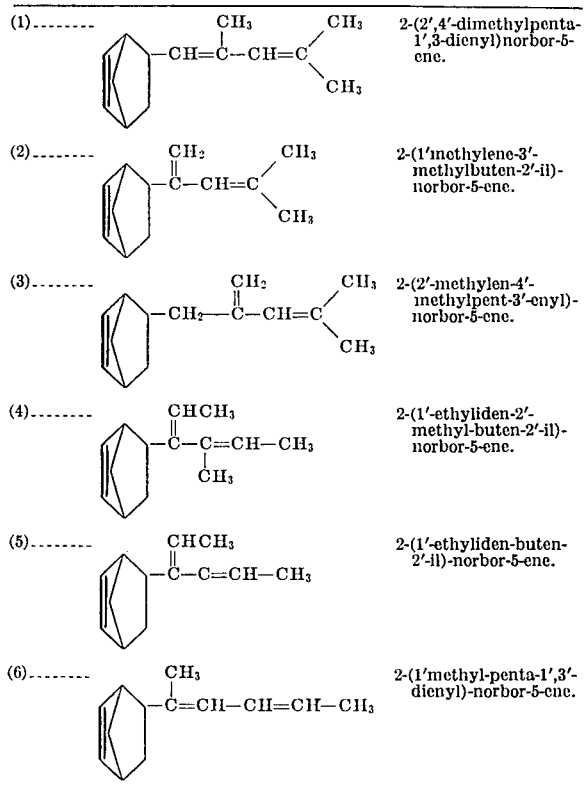

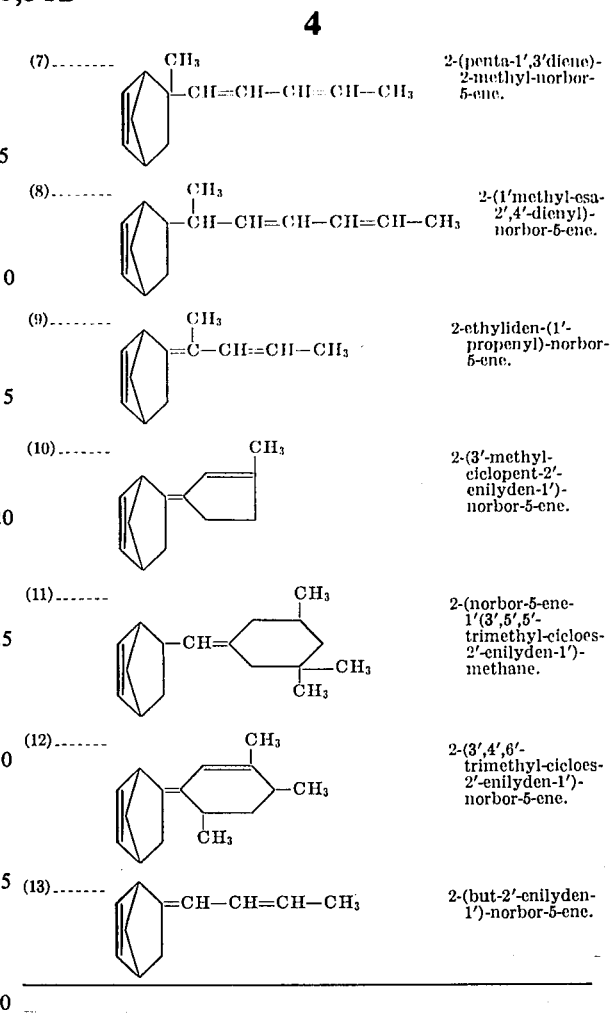

The invention is illustrated by the following examples.

EXAMPLE 1

1 mole of Mg and 500 cc of ethyl ether were put into a three neck flask provided with a stirrer, a charge funnel and a reflux condenser; 186 g (1 mole) of bromomethylnorbornene were dripped, the temperature being kept at 35° C. The reaction ended after about two hours. 1 mole of fresh distilled mesityl oxide was slowly added to the above solution at the temperature of 5°–10° C. and it was allowed to react for two hours longer. It was then decomposed by an aqueous solution of $CH_3COOH(pH=5)$, again and again extracted by ether; the ether extract was washed by $NaHCO_3$ and then by water.

It was dried on $Na_2SO_4$; the ether was distilled and the resulting product was fractioned. During the slow fractionation, the hydroxyl derivative spontaneously dehydrated forming a product having the b.p. = 52° C. at 0.1 mmHg, $n_D^{25}$ = 1.5057 and a molecular weight of 188, which molecular weight having been determined by means of mass-spectrometry analysis. The total yield was higher than 90 percent.

At a gas-chromatography investigation the obtained product was seen to consist of a mixture of four isomers which showed very different retention times having the following values: $A=9'36''$, $B=12'48''$, $C=14'15''$, $D=15'42''$.

The above retention times were measured by means of an 8 m EAS column at 5 percent on 60 + 80 mesh firebrick, at a column temperature of 100° C. and an evaporation temperature of 200° C.

The compounds A–D and B–C were studied by a spectroscopic analysis: they were equal between themselves and, particularly, the compounds A–D were corresponding to the structure 1, whereas the compounds B–C were corresponding to the structure 3.

At UV examination, fractions riched of 3 showed λ max=234mμ and ε=9430 lt/mol.cm; which data are typical data of a trisubstituted conjugated diene system. At IR analysis it was possible to see absorption bands at 3060 and 3080 cm$^{-1}$ (stretching = CH), 1568 cm$^{-1}$ (stretching norbornene C = C), 1625 cm$^{-1}$ (stretching C = C), 890 cm$^{-1}$ (bending out of plain of vinylidene) 717 cm$^{-1}$ (bending out of plain of the norbornene double bond).

At NMR analysis there were some signals corresponding to unsaturated protons at 6.0 – 5.55 –4.88 ppm, and signals of saturated protons at 2.72 – 1.76 – 1.32 and 0.67 ppm. Fractions riched of 1 showed an IR spectrum having absorption bands at 3060 and 3080 cm$^{-1}$ (stretching = CH), 1570 cm$^{-1}$ (stretching of norbornene C = C), 1628 cm$^{-1}$ (stretching C = C), 840 cm$^{-1}$ (bending of —CH = C) and 719 cm$^{-1}$ (bending out of plain of norbornene C = C). The NMR spectrum showed signals of unsaturated protons at 6.0 and 5.8 ppm, and of saturaged protons at 2.73 — 1.70 — 1.27 and 0.64 ppm.

EXAMPLE 2

By working according to the preceding example, a 2 M solution of 2-formyl-2-methyl-norbor-5-ene, obtained by reacting cyclopentadiene with alpha-methyl-acrolein, was added to 400 cc of a tetrahydrofuran 2 M solution of the Grignard derivative of the crotyl bromide.

The adding of the carbonyl compound to the magnesium compound was carried out slowly at a temperature ranging from 35° to 40° C; at the end, the reaction mass was allowed to boil for about 2 hours. Then the working procedure of the Example 1 was followed: an oily product remained after the removal of the solvent, which product was percolated in an inert atmosphere through a column consisting of γ-Al$_2$O$_3$ kept at 250° C. Under a light low, it was possible to recover a ruddy liquid which was rectified at reduced pressure; at the end a compound was obtained at a yield of 60 percent, which compound had a boiling point of 71° C. at 2 mm Hg and, by spectroscopic analysis, was seen to correspond to the structure 7.

EXAMPLE 3

By working according to the aforesaid process, the product of the reaction between cyclopentadiene and vinyl-ethyl-ketone was condensed with the Grignard derivative of 1-bromine-propene 1. The obtained alcohol was dehydrated on Al$_2$O$_3$: after rectification a liquid was obtained having a b.p. = 70° C. at 3 mm Hg and corresponding to the structure 5 on the ground of spectroscopic analysis.

EXAMPLE 4

According to the Diels-Alder reaction, 3-methyl-octa-1,4,6-triene was condensed with cyclopentadiene, in n-heptane at the temperature of 180° C. After the recovery of the reaction product and the removal of the solvent, a liquid was obtained having a b.p. = 70° C. at 0.1 mm Hg and corresponding to the structure 8 on the ground of the spectroscopic characteristics.

EXAMPLE 5

In a three-neck flask provided with a reflux condenser and a mechanical stirrer, 2 moles of the Grignard derivative of the 2-bromo-methyl-norbor-5-ene dissolved into 1 l of ethyl ether were allowed to react with 2 moles of isophorone dissolved into 0.5 l of ethyl ether: the carbonyl compound was added drop by drop, the mass reaction being cooled. The adding of the ketone having been ended, the reaction was finished by reflowing the reaction mass for 3 hours.

At the end the magnesium salts were hydrolyzed by a mixture of H$_2$O (300 cc) and CH$_3$COOH (200 cc); then the ether extracts were washed and dried on Na$_2$SO$_4$. The ether was removed by distillation; there, by increasing the temperature of the heating bath at a pressure of 0.5 mm Hg, it was possible to note both the spontaneous dehydration of the obtained alcohol and the distillation of a light-yellow liquid showing b.p. =85°-90° C. at 0.5 mm Hg, $n_D^{20}$ = 1.5244. The yield was of 67 percent.

At a gas-chromatography investigation the obtained product was seen to consist of a mixture of three compounds (molecular weight = 228, determined by mass – spectrometry examination) which showed the following retention times: $A$=8'14'', $B$=10'6'', $C$=11'7''.

The above retention times were measured by means of a 3 m EAS column at 5 percent on 60 + 80 mesh firebrick, at a column temperature of 150° C., an evaporation temperature of 200° C. and a flow of H$_2$ equal to 10 cc/10''.

The spectroscopic analysis of the obtained liquid showed the A.B.C. components were isomer compounds of the product having the formula 11.

The UV examination showed a $\lambda_{max}$ = 246mμ (well according to theoretical $\lambda_{max}$ of 11, equal to 242mμ) and ε = 18.700 l/mole.cm which had the typical high amount of the hexacyclic rings.

The IR investigation showed absorption bands at 3060 and 3080 cm$^{-1}$ (stretching = CH), 1642 cm$^{-1}$ (stretching C = C), 1569 (stretching of norbornene C = C), 1382 and 1364 cm$^{-1}$

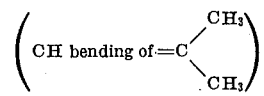

and 719 cm$^{-1}$ (bending out of plane of norbornene —CH). At the NMR examination it is possible to note signals of unsaturated protons at 6.03 ppm and of saturated protons at 2.77 – 1.35 – 0.95 and 0.66 ppm.

EXAMPLE 6

By working according to the preceding example, a tetrahydrofuran 2 M solution of the compound obtained by reacting cyclopentadiene and methylvinylketone was added to same volume of a 2 M solution of the Grignard derivative of 1 bromo-propene-1. Then the working procedure of the Example 5 was followed: a liquid product was obtained after the washing of the ether solution and the removal of the solvent, which product was percolated on γ —Al$_2$O$_3$ at 300° C. making a product obtained having a boiling point of 60° C. at 5 mm Hg. At the gas-chromatography analysis (5 m EAS column at 5 percent on 60+ 80 mesh firebrick, $T_{col}$=110° C., $T_{ev}$=180° C., H$_2$ flow=10 cc/10'') it showed three peaks having the following retention times: 10'48'', 11'24'', 13'39''. The mass-spectrometry analysis said the three compounds had the same molecular weight, equal to 160. The spectroscopic analysis showed there were three isomer compounds well according to the formula 9.

The UV investigation of the product gave a $\lambda_{max}$=231mμ and ε = 10.450 C/mole.cm. The IR spectrum showed the following characteristic absorption bands: 3060 and 3090 cm$^{-1}$ (stretching of = C—H), 1603 – 1620 – 1635 cm$^{-1}$ (stretching of C=C), 1557 cm$^{-1}$ (stretching of norbornene C= C), 962 cm$^{-1}$ (bending out of plane of trans C = C), 890 cm$^{-1}$ (bending out of plane of the vinylidene group), and 718 cm$^{-1}$ (bending out of plane of norbornene C = C).

EXAMPLE 7

A tetrahydrofuran solution of the Grignard derivative of the crotyl bromide was allowed to react with an equimolecular amount of dehydro-nor-camphor. The procedure of the Example 5 was followed: after dehydration of the alcohol on Al$_2$O$_3$, a product was obtained having a boiling point of 45° C. at 5 mm Hg and a molecular weight equal to 146.

On the ground of the spectroscopic characteristics the compound was well according to the formula 13.

What we claim is:

1. Polyene hydrocarbons containing at least two conjugated double bonds having the following general formula:

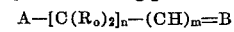

in which A is a radical consisting of a ring containing an endomethylene group; B may be both a linear alkadiene radical and a substituted and unsubstituted alkene or cycloalkene radical; $R_o$ may be hydrogen, an aryl or an alkyl radical; $n$ is a number ranging from 0 to 3 and $m$ a number selected between 0 and 1, $m$ being 0 if $n$ is different from 0, whereas $m$ may be both 0 and 1 if $n$ is 0.

2. Polyene hydrocarbons according to claim 1 characterized in that n is different from 0, A is a radical having the formula:

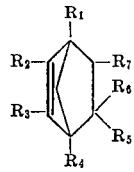

in which $R_1$, $R_2$, $R_3$, $R_4$, $R_5$, $R_6$ and $R_7$ are hydrogen, alkyl, cycloalkyl or aryl radicals; B is an alkadiene group containing two conjugated double bonds and selected between the following radicals:

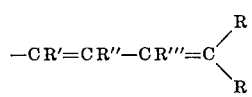

and

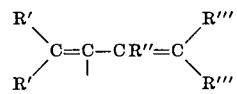

wherein R always is an alkyl radical, R', R'' and R''' may be hydrogen, alkyl or aryl radicals.

3. Polyene hydrocarbons according to claim 1 characterized in that $n$ is 0; A is a radical having the formula:

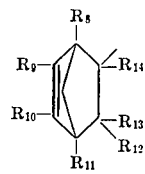

if $m$ is 1, and the formula

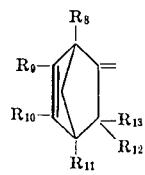

if $m$ is 0; $R_8$, $R_9$, $R_{10}$, $R_{11}$, $R_{12}$, $R_{13}$ and $R_{14}$ being hydrogen or alkyl radicals having one to five carbon atoms; B is a radical selected from the following ones:

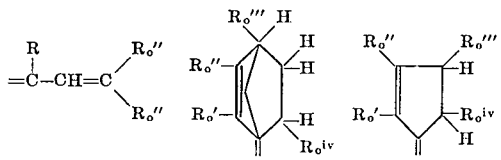

in which $R_o'$, $R_o''$, $R_o'''$ and $R_o^{iv}$ may be hydrogen or alkyl radicals having one to five carbon atoms.

4. A process for the preparation of polyene hydrocarbons according to claim 2 characterized in that said hydrocarbons are obtained by reacting a carbonyl compound having the carbonyl group conjugated with a carbon-carbon double bond with a Grignard derivative as

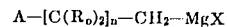

in which A and $R_o$ have the aforesaid meanings and X is a halogen selected among Cl, Br or I.

5. A process for the preparation of polyene hydrocarbons according to claim 2 characterized in that said hydrocarbons are obtained by reacting a carbonyl compound having the formula

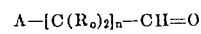

with Grignard derivatives as

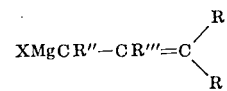

wherein A, R, R'', R''', X and $n$ have the above mentioned meanings.

6. A process for the preparation of polyene hydrocarbons according to claim 2 characterized in that said hydrocarbons are obtained by means of the Diels-Alder reaction between cyclopentadiene and triolefins having at least two conjugated double bonds and alkyl substituents in the carbon atoms engaged with the conjugated double bonds.

7. A process for the preparation of polyene hydrocarbons according to claim 3 characterized in that said hydrocarbons are obtained by reacting a Grignard derivative of a substituted allyl or vinyl halide with a carbonyl compound having an endomethylene group.

8. A process according to the preceding claim 7 characterized in that the Grignard derivative is selected from the following ones:

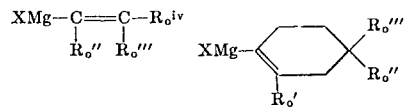

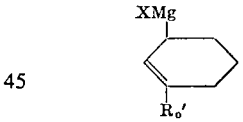

in which $R_o'$, $R_o''$, $R_o'''$ and $R_o^{iv}$ have the meanings of claim 3 and X is a halogen selected among Cl, Br or I.

9. A process for the preparation of polyene hydrocarbons according to claim 3 characterized in that said hydrocarbons are obtained by reacting a Grignard derivative of a norbornene halide having the formula

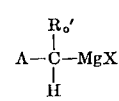

wherein A, $R_o'$ and X have the known meanings, with a cyclic ketone in which the carbonyl group is conjugated with a double bond.

* * * * *